March 2, 1948. F. J. CULBERT 2,436,855
INTERNAL-COMBUSTION ENGINE
Filed Sept. 1, 1942 2 Sheets-Sheet 2

INVENTOR
Fred James Culbert.
BY
ATTORNEY

Patented Mar. 2, 1948

2,436,855

UNITED STATES PATENT OFFICE 2,436,855

INTERNAL-COMBUSTION ENGINE

Fred James Culbert, Norfolk, Va.

Application September 1, 1942, Serial No. 456,949

10 Claims. (Cl. 123—32)

(Granted under the act of March 3, 1883, as amended April 30, 1928; 370 O. G. 757)

In high speed internal combustion engines of the fuel injection type by reason of the very short space of time available for injection of the liquid fuel and subsequent mixing with the air charge and burning thereof, forcible intermixture of the complete fuel charge is essential. Wherefore, in effect, it has been found that the more thoroughly the liquid fuel vapor is dispersed and blended with the compressed air the more efficiently and completely the fuel is burned. Simple forms of spinning or whirling tend to stratify the richer and leaner portions of the fuel charge, which results in erratic and incomplete burning, smoky exhaust, carbon deposits and other faults indicative of a poorly governed combustion process. This invention employing a system of cross-flows in the process of intermingling the components of the combustible charge during and ensuing the period of injection of the liquid fuel, in actual practice makes for astonishingly smooth and efficient engine operation with clear exhaust and a total absence of carbon accumulation on the piston crown and within the combustion space. It also makes for remarkably favorable engine acceleration characteristics and quick engine starting at sub-normal atmospheric temperatures.

This invention consists substantially of new, durable and effective means to produce a high velocity involute whirling of the air charge in the combustion chamber during the compression stroke and for a period following the instant of the liquid fuel injection to also spin the whirling air and the liquid fuel mixture within the circular confinement of the main combustion space, whereby all the components of the completed fuel charge are forcibly intermingled and thoroughly blended and a rapid and evenly inclined acceleration of burning is obtained.

Although only one preferred form is shown in the accompanying drawings, it is understood that obvious modifications in dimensions, shape and arrangement of parts may be made without departing from the scope of this invention.

Figures 1, 3:
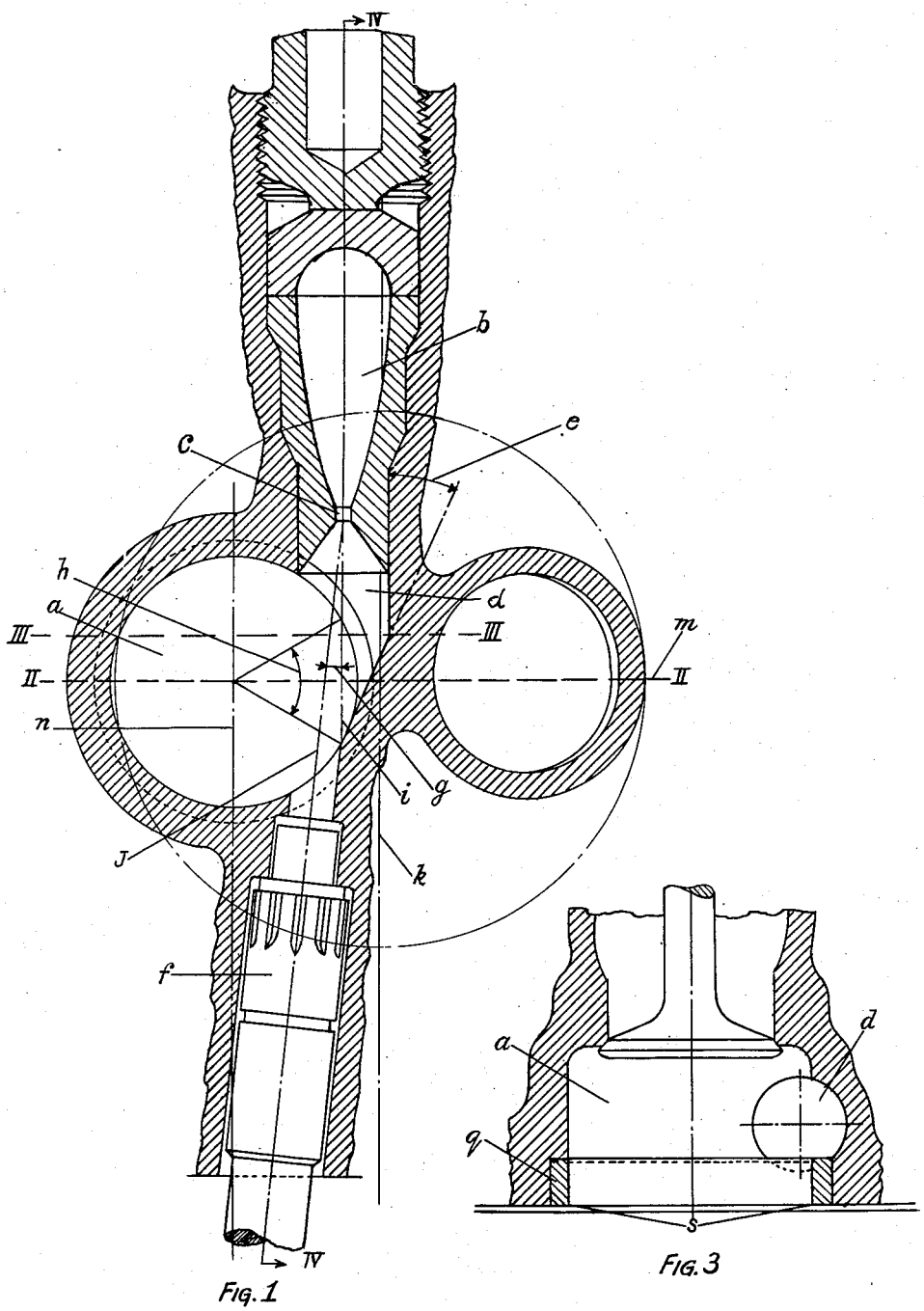
Fig. 1 shows a section through the cylinder head of a preferred form of the invention.
Fig. 3 is a section of the combustion chamber taken so as to show the semicylindrical cavity in the wall thereof.

Fig. 1 which is a plan section through the cylinder head shows in section the main and auxiliary combustion spaces and the bored receptacle containing the fuel injection nozzle, $a$ being the main combustion space, $b$ the auxiliary combustion space, $c$ the aperture that serves to unite the main and auxiliary combustion spaces, $d$ a cylindrical bored section by which a semicylindrical cavity is formed in the wall of the main combustion space and through which a portion of the discharge from the auxiliary combustion space is required to pass enroute to the main combustion space, $e$ the angular termination of cavity $d$ by which a portion of the discharge from the auxiliary combustion space is deflected into the field of the main combustion space $a$, $f$ the fuel injection nozzle, $g$ the angular relationship between the extended axis of the aperture uniting the main and auxiliary combustion space and the extended axis of the fuel injection nozzle which angle according to the invention is to be retained within acute proportions, $h$ the chord obtained by extending the axis of the aperture uniting the main and auxiliary combustion spaces across the main combustion space, the points of intersection with the encircling boundary of the main combustion space according to the invention to register apart not to exceed one hundred degrees of the circumference of the main combustion space, $i$ a line denoting the extending of the axis of the aperture uniting the main and auxiliary combustion spaces across the main combustion space, $j$ a line denoting the extending of the axis of the fuel injection nozzle across the main combustion space. With particular regard to $i$ and $j$ according to the invention the fuel injection nozzle is located in a suitable bored receptacle in the wall of the main combustion space opposite to the aperture uniting the main and auxiliary combustion spaces and angular to the axis of said aperture in such a way that the chord obtained by extending the axis of the fuel injection nozzle across the main combustion space has a greater length than the like chordal crossing of the axis of the aperture uniting the main and auxiliary combustion spaces, the angular relationship of said chords being of acute proportions and having the vertex of the angle so situated along the axis of the aperture uniting the main and auxiliary combustion spaces that the core of the fuel spray from the fuel injection nozzle is directed chordally across the main combustion space and toward the said aperture, $k$ and $m$ are center lines the crossing of which denotes the major axis of the piston. The crossing of lines $m$ and $n$ denoting the major axis of the main combustion space which according to the invention is preferred to be located substantially off center of the piston crown.

Figure 2:
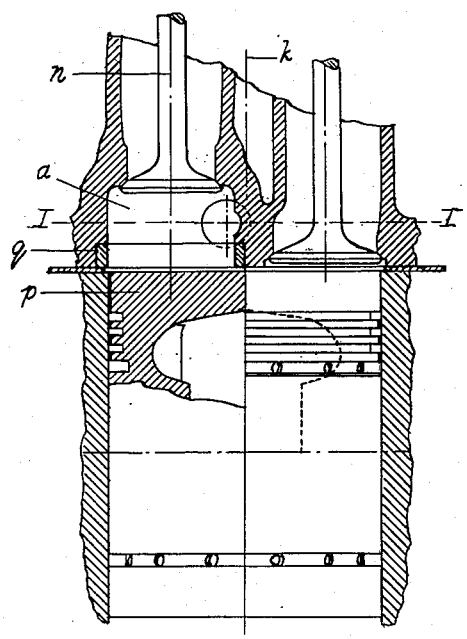
Fig. 2 is a section through the cylinder, head and partially through the piston.
Figure 4:
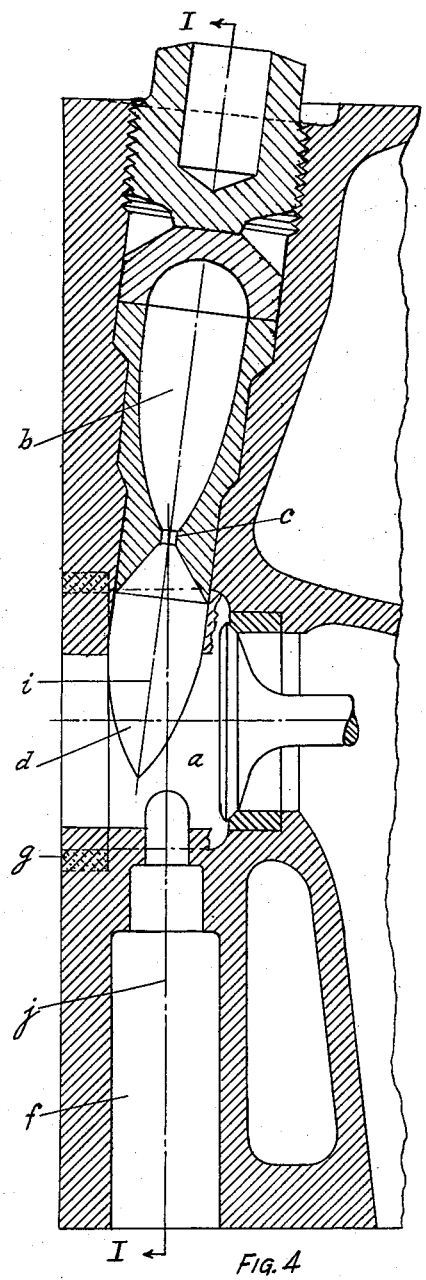
Fig. 4 is a cross-section of Fig. 1 on the line IV—IV.

In Fig. 2 a section in elevation is shown of the cylinder head through the main combustion space $a$. In this illustration the piston $p$ is shown in the cylinder and the ring insert $q$ is shown in accordance with the invention as forming the open end of the main combustion space.

In Fig. 3 which is an elevation section through the main combustion space for the purpose of showing a cross section of the semicylindrical cavity $d$ and the ring insert $q$ in place, $s$ relating to the open end corner of the ring insert which according to the invention is preferably of a sharp right angle formation.

The respective locations of the liquid fuel injection nozzle and an auxiliary combustion chamber in their axial relation about the main combustion chamber are such that they contribute largely to the process of intermixing and blending of the fuel charge, and additional benefits are obtained in the liquid fuel and air mixing effect by having the main combustion space located substantially off center of the piston crown and by having the open end corner of the main combustion space of sharp right angle formation. By locating the fuel injection nozzle axis in a position angular to the axis of the aperture uniting the main and auxiliary combustion spaces the invention provides for protecting the fuel injection nozzle spray tip from the direct blast from the auxiliary combustion space and by having the axis of the aperture uniting the main and auxiliary combustion spaces tangential or practically tangential with the arc describing the encircling boundary of the main combustion space the invention provides that the discharge from the auxiliary combustion space is spent on moving the contents of the main combustion space circuitously about the main combustion space and over the piston crown.

According to the invention a semicylindrical cavity is provided in the wall of the main combustion space in such a way as to provide clearance space for the discharge stream from the auxiliary combustion space and through which a portion of said stream is required to pass enroute to the main combustion space. Said cavity having an angular surface termination with the arc describing the encircling boundary of the main combustion space and this angular surface of the said cavity serving as a baffle by which a portion of said stream is deflected against that portion that has free access to the field of the main combustion space thereby directly causing a cross-flow effect in the directing of the discharge from the auxiliary combustion space into the main combustion space. The said cavity by reason of its trough like shape also serving to a large extent to confine the discharge action from the auxiliary combustion space that the forces therefrom are spent principally towards causing the gaseous content of the main combustion space to move in a circuitous course. The invention also provides for locating the aperture that unites the main and auxiliary combustion spaces near about the center of the piston crown which, in effect, has been found the most appropriate location to insure of ignition commencing on piston center and thereby an absence of piston canting action.

The invention also provides a ring insert of an appropriate material and so arranged as to encompass the main combustion space and by which the open end corner of the main combustion space is formed, thereby screening the cylinder head proper from the intensity of the heat of combustion that the said corner is normally subjected to and also providing greater durability to the designed shape of said corner than is obtained by the material of which cylinder heads are usually cast. The designed shape of said corner being one of the governing features in the fuel intermixing process preparatory to combustion and also for a period during the burning process and being preferably of a sharp right angle formation.

It will be noted from the description and the illustrations in the drawing that the invention broadly includes an arrangement in a fuel injection engine, of a main combustion space of substantially circular cross-section, an auxiliary combustion cell and a fuel jet injector oppositely disposed at one side of said circular section and having their discharge axes passing through said circular section and making an angle with each other of approximately 10° said cell discharge axis being directed along a chord of said circular section subtending not more than 100°, the chord produced by extending said fuel jet axis being of a greater magnitude.

More specifically the invention includes an arrangement of a main combustion space of substantially circular cross-section, an auxiliary combustion cell having a flaring restricted opening formed tangentially to the inner surface of said combustion space a fuel injector located opposite said cell and arranged to inject a jet of fuel having its central axis in a line along a chord of said space, said axis forming an angle of not more than 10° with the line formed by extending the axis of said restricted opening, said injector being so located that said line along said chord will lie between the center of said space and the axis of said restricted opening.

Still more specifically the invention contemplates an arrangement in an internal combustion engine cylinder having a reciprocating piston, comprising the combination of a flat-surfaced cylinder head, a flat-topped piston closely approaching said flat-surfaced cylinder head during its operation, a cylindrical main combustion chamber in said cylinder head, normal to and opening at one end in said flat surface, whereby a torroidal motion is set up in the compressed air in said combustion chamber at the end of the compression stroke, an auxiliary precombustion cell extending to one side in a chordal direction relative to the mid section of said combustion chamber, said chord subtending substantially less than a 100° arc of said section, a cylindrical groove in the side wall of said combustion chamber axially alined with said cell and connected thereto by a restricted axial nozzle, a deflecting surface at the end of said groove opposite said nozzle, tangential to the wall of said combustion chamber, and means for introducing a jet of fuel chordally across said combustion chamber toward said restricted nozzle, said last chord subtending an arc greater than the chord along the cell axis, whereby a portion of a jet of fuel may be caused to enter said cell during the compression stroke through said nozzle, and the precombustion therein will cause a blast of gases to issue toward said deflecting surface, and said deflected gases will pass through a portion of said fuel jet and induce a circumferential whirl to provide a substantially complete combustion of the mixture in said combustion chamber.

More specific additional limitations in the form of the invention shown in the drawings include: (1) the eccentric location of the combustion chamber relative to the cylinder axis, (2) the arrangement of the precombustion cell and fuel introducing means on opposite sides of the cylinder on the inner side of said cell relative to said cylinder, (3) the arrangement wherein the smaller chord subtends approximately 65° and the larger chord substantially 90°, and (4) the specific arrangement wherein further the deflecting surface makes an angle of about 25° with the cell axis.

Where I have used the term "liquid fuel" in this application it is to be understood that I am not to be limited in the application of the invention to liquid fuels only. It may be that finely powdered coal or other combustible substances may be used either with fuel oil, alcohols or other materials. Of course, fuel oil alone is a usual type of fuel for use in my engine.

This invention may be used by or for the Government of the United States for governmental purposes without the payment to me of any royalties thereon or therefor.

What I claim is:

1. An internal combustion engine having an engine cylinder, a cylinder head having a cylindrically shaped main combustion chamber set off to one side of the engine cylinder axis with one end open to the engine cylinders, a flat top piston for displacing all of the compressed air charge into said combustion chamber, a fuel jet injector on one side of said cylinder head having its jet axis substantially parallel to the piston top about midway up the combustion chamber and passing chordally through the inner side of said chamber with respect to the cylinder axis, an auxiliary combustion chamber on the opposite side of the cylinder head from said injector connected by a restricted nozzle passage substantially tangentially to said main combustion chamber, said nozzle having its restriction substantially in line with the fuel jet axis but being directed at a slight angle inwardly of said axis with respect to the cyclinder axis.

2. In an injection engine, a cylinder and a piston operating therein, a combustion chamber opening into said cylinder, a supplementary chamber opening into said combustion chamber between a diameter and one side thereof through a restricted orifice and a funnel-like passage flaring from said orifice toward said combustion chamber, said passage having a wall merging with said side of said combustion chamber substantially tangentially thereof, and an injection nozzle having a port disposed to inject a spray of fuel across said combustion chamber and into said passage on a chord adjacent said one side of said combustion chamber, said nozzle being timed to effect said injection before top dead center piston position, the distance between the port of said nozzle and said orifice and passage being such as to assure entry of injected fuel into said supplementary chamber in proper amount to form with the air therein a quick burning fuel-air mixture effective for producing within said supplementary chamber incident to combustion therein relatively high pressure effective for ejecting therefrom after top dead center piston position a high-pressure high-velocity blast of gases through said orifice and passage, said orifice and passage being disposed to discharge said blast into said combustion chamber on a chord intersecting said first-named chord and traversing said combustion chamber nearer said combustion chamber side than said first-named chord, whereby said blast impinges upon said combustion chamber side and is deflected thereby into a peripheral sweep toward the opposite side of the combustion chamber.

3. A fuel injection engine having a main combustion space of substantially circular cross section, an auxiliary combustion cell and a fuel jet injector oppositely disposed at one side of said circular section and having their discharge axes passing through said circular section and making an angle with each other of approximately 10°, said cell discharge axis being directed along a chord in said circular section subtending not more than 100°, the chord produced by extending said fuel jet axis being of greater magnitude.

4. In an internal combustion engine cylinder having a reciprocating piston, the combination comprising a flat-surfaced cylinder head, a flat-topped piston closely approaching said flat-surfaced cylinder head during its reciprocation, a cylindrical main combustion chamber in said cylinder head of smaller diameter than said cylinder normal to and opening at one end in said flat surface, whereby a torroidal motion is set up in the compressed air in said combustion chamber at the end of the compression stroke, an auxiliary precombustion cell extending to one side in a chordal direction relative to the mid section of said combustion chamber, said chord subtending substantially less than 100° of arc of said section, a groove in the side wall of said combustion chamber axially alined with said cell and connected thereto by a restricted axial nozzle, a deflecting surface at the end of said groove opposite said nozzle tangential to the wall of said combustion chamber, and means for introducing a jet of fuel chordally across said combustion chamber toward said restricted nozzle, said last chord subtending an arc greater than the chord along the cell axis, whereby a portion of the jet of fuel may be caused to enter said cell during the compression stroke, the precombustion therein causing a blast of gases to issue toward said deflecting surface, and said deflected gases passing through a portion of said fuel jet and inducing a circumferential whirl and complete combustion of the mixture in said combustion chamber.

5. In an internal combustion engine cylinder having a reciprocating piston, the combination defined in claim 4 wherein the combustion chamber is eccentrically located relative to the cylinder axis.

6. The combination defined in claim 5 wherein the precombustion cell and the fuel introducing means are arranged on opposite sides of the cylinder and between the chamber and cylinder axes.

7. The combination defined in claim 6 wherein the smaller chord subtends approximately 65° and the larger chord substantially 90°.

8. The combination defined in claim 7 wherein the deflecting surface makes an angle of 25° with the cell axis.

9. The combination defined in claim 4 wherein the smaller chord subtends approximately 65° and the larger chord approximately 90°.

10. The combination defined in claim 9 wherein the deflecting surface makes an angle of about 25° with the cell axis.

FRED JAMES CULBERT.

(References on following page)

REFERENCES CITED

The following references are of record in the file of this patent:

UNITED STATES PATENTS

| Number | Name | Date |
|---|---|---|
| 2,012,086 | Mock | Aug. 20, 1935 |
| 2,055,814 | Dennison | Sept. 29, 1936 |
| 2,065,025 | Ricardo | Dec. 22, 1936 |
| 2,112,787 | Ricardo | Mar. 29, 1938 |
| 2,120,768 | Ricardo | June 14, 1938 |
| 2,157,659 | Fisher | May 9, 1939 |
| 2,173,526 | Treiber | Sept. 12, 1939 |
| 2,190,537 | Wiebiche | Feb. 13, 1940 |
| 2,236,950 | Ricardo | Apr. 1, 1941 |
| 2,264,205 | Hellemn | Nov. 25, 1941 |

FOREIGN PATENTS

| Number | Country | Date |
|---|---|---|
| 688,054 | France | Aug. 19, 1930 |
| 369,229 | England | Dec. 16, 1930 |
| 455,329 | England | 1936 |
| 615,602 | Germany | July 8, 1935 |